United States Patent
Keller et al.

(10) Patent No.: US 10,829,096 B2
(45) Date of Patent: Nov. 10, 2020

(54) RETROFITTABLE FLOATING BRAKE SYSTEM AND METHOD OF MANUFACTURING A RETROFITTABLE FLOATING BRAKE SYSTEM

(71) Applicant: Par-Kan Company, LLC, Silver Lake, IN (US)

(72) Inventors: Michael Keller, Silver Lake, IN (US); Michael Atchison, Silver Lake, IN (US); Kyle Bruner, Silver Lake, IN (US)

(73) Assignee: Par-Kan Company, LLC, Silver Lake, IN (US)

( * ) Notice: Subject to any disclaimer, the term of this patent is extended or adjusted under 35 U.S.C. 154(b) by 113 days.

(21) Appl. No.: 15/497,837

(22) Filed: Apr. 26, 2017

(65) Prior Publication Data

US 2018/0312144 A1    Nov. 1, 2018

(51) Int. Cl.
*B60T 1/04*   (2006.01)
*B60T 11/08*   (2006.01)

(52) U.S. Cl.
CPC ............... *B60T 1/04* (2013.01); *B60T 11/08* (2013.01)

(58) Field of Classification Search
CPC ... B60T 1/04; B60T 11/08; B62B 5/04; B62B 5/0485
USPC ............................. 188/9, 13, 176, 15, 29, 19
See application file for complete search history.

(56) References Cited

U.S. PATENT DOCUMENTS

| | | | | |
|---|---|---|---|---|
| 12,539 A | * | 3/1855 | Blodgett | B62B 5/04 188/19 |
| 29,232 A | * | 7/1860 | Bennett | H04R 11/12 188/176 |
| 50,248 A | * | 10/1865 | Holcroft | B62B 5/04 188/19 |
| 72,370 A | * | 12/1867 | Codwise | B62B 5/04 188/19 |
| 226,451 A | * | 4/1880 | Jones et al. | B62B 5/04 188/19 |
| 302,359 A | * | 7/1884 | Sparks | B62B 5/04 188/29 |
| 408,015 A | * | 7/1889 | Kauffman | B60T 1/04 188/13 |
| 493,676 A | * | 3/1893 | Bobo | B62B 5/04 188/19 |
| 655,936 A | * | 8/1900 | Meyer | B60T 1/04 188/9 |
| 994,647 A | * | 6/1911 | McPeek | A61H 3/04 188/176 |
| 997,531 A | * | 7/1911 | Wright | B60T 1/04 188/9 |
| 2,488,203 A | * | 11/1949 | Klein | B60T 1/04 188/119 |

(Continued)

*Primary Examiner* — Xuan Lan Nguyen
(74) *Attorney, Agent, or Firm* — Polsinelli PC; Adam C. Rehm

(57) ABSTRACT

A vehicle brake system operable to simultaneously apply an equal amount of braking pressure to a plurality of tires. The system includes a pair of brake guides, a brake bar secured to the brake guides, and a control bar secured to the brake bar. The control bar is operable to move the brake bar back and forth so that a portion of the brake bar selectively abuts the plurality of tires to apply the braking pressure. The system may be retrofitted to existing vehicles or fitted to new vehicles.

20 Claims, 12 Drawing Sheets

(56) References Cited

U.S. PATENT DOCUMENTS

| | | | | |
|---|---|---|---|---|
| 2,558,917 | A * | 7/1951 | Woodard | B60T 1/04 |
| | | | | 188/19 |
| 3,194,337 | A * | 7/1965 | Parks | B60K 17/00 |
| | | | | 180/341 |
| 3,811,535 | A * | 5/1974 | Preusser | B62B 5/04 |
| | | | | 188/21 |
| 4,166,519 | A * | 9/1979 | Maloney | A63C 17/01 |
| | | | | 188/2 R |
| 5,524,731 | A * | 6/1996 | Grieg | B62B 5/04 |
| | | | | 188/19 |
| 9,744,955 | B1 * | 8/2017 | Hoeper | B60T 11/04 |
| 2010/0059956 | A1 * | 3/2010 | Stillinger | A63C 17/012 |
| | | | | 280/87.041 |
| 2017/0217356 | A1 * | 8/2017 | Yim | B60P 3/30 |

* cited by examiner

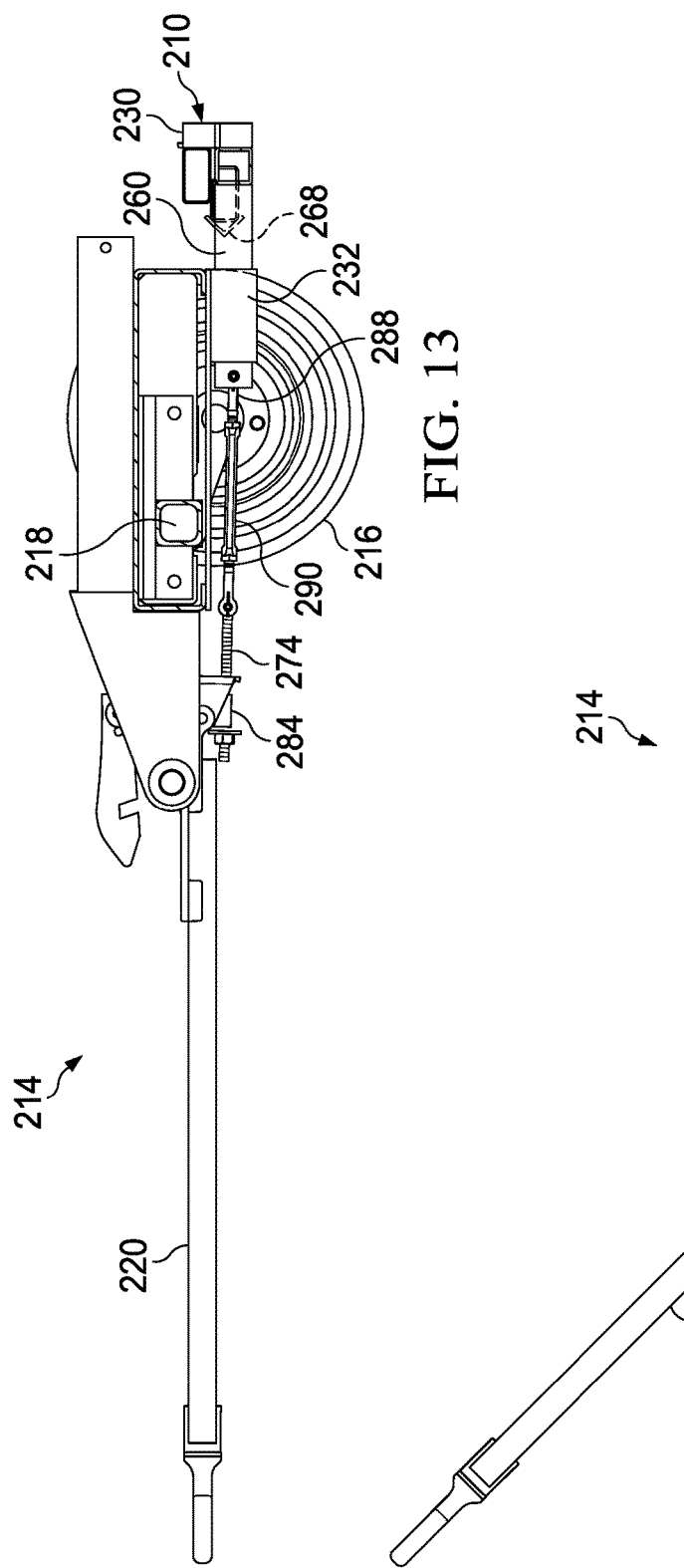
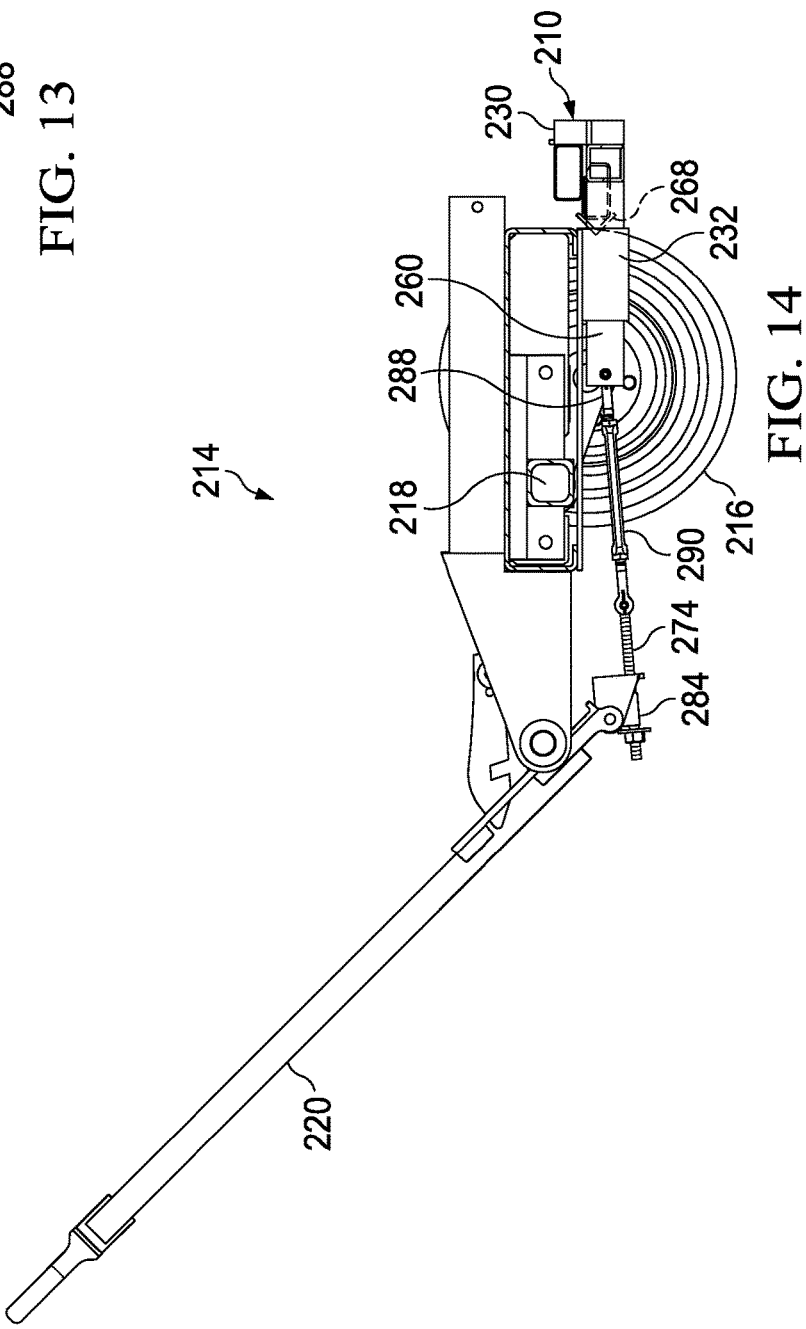
FIG. 13
FIG. 14

RETROFITTABLE FLOATING BRAKE SYSTEM AND METHOD OF MANUFACTURING A RETROFITTABLE FLOATING BRAKE SYSTEM

BACKGROUND OF THE INVENTION

1. Field of the Invention

The present inventive concept relates generally to the field of brakes, and more particularly, to a retrofittable floating brake system and method of manufacture.

2. Description of the Related Art

Conventional braking systems on conventional airport ground-support equipment (GSE), such as utility carts, are commonly applied by causing an obstruction to move toward and abuttingly engage a pair of tires of the GSE, which creates friction between the obstruction and the tires and causes the GSE to stop. In many scenarios, however, tires of the GSE wear unevenly, which causes such tires to have different diameters. As such, when the conventional braking system is applied, the obstruction first engages the tire having less wear with a relatively larger diameter, which causes the GSE to suddenly jerk to one side. This sudden movement of the GSE can catch an operator of the GSE off guard and can lead to possible injury.

No known solution exists to equalize braking pressure on a pair of tires having different diameters. Further, it would be undesirable to replace the GSE, in its entirety, to utilize a different braking system.

Accordingly, there is a need for a vehicle brake system that does not suffer from the limitations of conventional systems, has a design operable to simultaneously apply equal braking pressure to a pair of tires regardless of whether the tires are evenly worn, is retrofittable to existing vehicles, and has a design that is economical to manufacture and easy to use.

SUMMARY OF THE INVENTION

The following brief description is provided to indicate the nature of the subject matter disclosed herein. While certain aspects of the present inventive concept are described below, the summary is not intended to limit the scope of the present inventive concept. Embodiments of the present inventive concept provide a vehicle brake system operable to simultaneously apply equal braking pressure to a plurality of tires. The system may be fitted to a new vehicle during manufacture thereof or retrofitted to an existing vehicle post manufacture. The present inventive concept does not suffer from and remedies the deficiencies of conventional braking systems such as those previously set forth herein.

The present inventive concept provides, in its simplest form, a vehicle brake system having a pair of brake guides, a brake bar secured to the brake guides, and a control bar secured to the brake bar. The control bar is operable to move the brake bar back and forth so that a portion of the brake bar selectively abuts a pair of tires on a vehicle and creates friction therebetween. The friction created by the system prevents the vehicle from moving or, if the vehicle is moving, causes the vehicle to slow and stop.

An object of the present inventive concept is to provide a brake system that is operable to simultaneously apply an equal amount of braking pressure or friction on a plurality of tires.

Another object of the present inventive concept is to provide a brake system that can be retrofitted to existing vehicles.

Another object of the general inventive concept is to provide a brake system that is easy to use, simple and economical to manufacture, and well adapted for the intended usage thereof.

The aforementioned objects and advantages of the present inventive concept may be achieved in an aspect of the present inventive concept by providing a retrofittable brake system. The system may include a pair of brake guides operable to be secured to a vehicle. The system may include a brake bar slidably secured to the brake guides so that portions of the brake bar are positioned adjacent to a pair of tires of the vehicle. The brake bar may have (i) a first configuration with the portions of the brake bar spaced from the pair of tires, and/or (ii) a second configuration with the portions of the brake bar abutting the pair of tires. The system may include a control bar secured to the brake bar and selectively operable to (i) cause the brake bar to be slidably moved longitudinally relative to the brake guides and between the first and second configurations, and/or (ii) allow the brake bar to abut the pair of tires in parallel and non-parallel configurations relative to a y axis of the vehicle. The brake bar is operable to abut the pair of tires in the parallel configuration when the tires have equal or same diameters. The brake bar is operable to abut the pair of tires in the non-parallel configuration when the tires have unequal or different diameters.

The control bar may be operable to cause the brake bar to be moved between the first and second configurations by (i) pulling the brake bar along a longitudinal plane/an x axis toward the pair of tires, and/or (ii) pushing the brake bar along the longitudinal plane/the x axis away from the pair of tires. The longitudinal direction may be along an x axis defined by or of the vehicle and the control bar. The control bar may extend perpendicularly from the brake bar at a center of the brake bar.

The system may include a link rod (i) secured between the control bar and a pivotable tow bar, and/or (ii) defining a variable distance between the control bar and the pivotable tow bar. The distance between the control bar and the pivotable tow bar may be selectively decreased or increased by changing a position of the link rod relative to the pivotable tow bar. The control bar and the brake bar may be operable to only be secured to the vehicle via a shackle and the brake guides. The system may include a plurality of abutment stops (i) secured to and spaced from each other along the brake bar, and/or (ii) operable to define a maximum range of lateral movement of the brake bar relative to the brake guides.

The brake bar may be operable to move along x and y axes relative to the vehicle. The x axis may extend (i) perpendicular to the brake bar in the parallel configuration of the brake bar, and/or (ii) parallel to the control bar. The y axis may extend (i) parallel to the brake bar in the parallel configuration of the brake bar, and/or (ii) perpendicular to the control bar.

The aforementioned objects and advantages of the present inventive concept may be achieved in another aspect of the present inventive concept by providing a method of manufacturing a brake system. The method may include the step of securing a pair of brake guides to a vehicle. The method may include the step of securing a brake bar to the brake guides so that portions of the brake bar are positioned adjacent to a pair of tires of the vehicle. The brake bar may have (i) a first configuration with the portions of the brake bar spaced from the pair of tires, and/or (ii) a second configuration with the portions of the brake bar abutting the pair of tires. The method may include the step of securing a control bar to the brake bar. The control bar may be selectively operable to (i) cause the brake bar to be slidably moved longitudinally relative to the brake guides and between the first and second configurations, and/or (ii) allow the brake bar to abut the pair of tires in parallel and non-parallel configurations relative to a y axis of the vehicle. The brake bar extends (i) parallel to the y axis of the vehicle in the parallel configuration, and (ii) at an angle to the y axis in the non-parallel configuration. The control bar extends (i) parallel to the x axis of the vehicle when the brake bar is in the parallel configuration, and (ii) at an angle to the x axis when the brake bar is in the non-parallel configuration.

The control bar may be operable to cause the brake bar to be moved between the first and second configurations by (i) pulling the brake bar along a longitudinal plane/an x axis toward the pair of tires, and/or (ii) pushing the brake bar along the longitudinal plane/the x axis away from the pair of tires. The control bar may extend perpendicularly from the brake bar at a center of the brake bar.

The method may include the step of securing a link rod between the control bar and a shackle attached to a pivotable tow bar. The link rod may define a variable distance between the control bar and the shackle and the pivotable tow bar. The distance between (i) the control bar and (ii) the shackle and the pivotable tow bar may be selectively decreased or increased by changing a position of the link rod relative to the shackle and the pivotable tow bar. The control bar and the brake bar may be operable to only be secured to the vehicle via a shackle and the brake guides.

The method may include the step of securing a plurality of abutment stops to and spaced from each other along the brake bar. The plurality of abutment stops may be operable to define a maximum range of lateral movement of the brake bar relative to the brake guides.

The brake bar is operable to move along x and y axes relative to the vehicle. The x axis may extend (i) perpendicular to the brake bar in the parallel configuration of the brake bar and/or (ii) parallel to the control bar. The y axis may extend (i) parallel to the brake bar in the parallel configuration of the brake bar, and/or (ii) perpendicular to the control bar.

The foregoing and other objects are intended to be illustrative of the present inventive concept and are not meant in a limiting sense. Many possible embodiments of the present inventive concept may be made and will be readily evident upon a study of the following specification and accompanying drawings comprising a part thereof. Various features and subcombinations of the present inventive concept may be employed without reference to other features and subcombinations. Other objects and advantages of this present inventive concept will become apparent from the following description taken in connection with the accompanying drawings, which set forth by way of illustration and example, an embodiment of the present inventive concept and various features thereof.

BRIEF DESCRIPTION OF THE DRAWINGS

A preferred embodiment of the present inventive concept, illustrative of the best mode in which the applicant has contemplated applying the principles, is set forth in the following description and is shown in the drawings.

FIG. 13 is a cross-sectional view of the vehicle brake system of FIG. 11 taken through section 13-13; and FIG. 14 a cross-sectional view of the vehicle brake system of FIG. 12 taken through section 14-14.

DETAILED DESCRIPTION OF THE PREFERRED EMBODIMENTS

Figure 1:
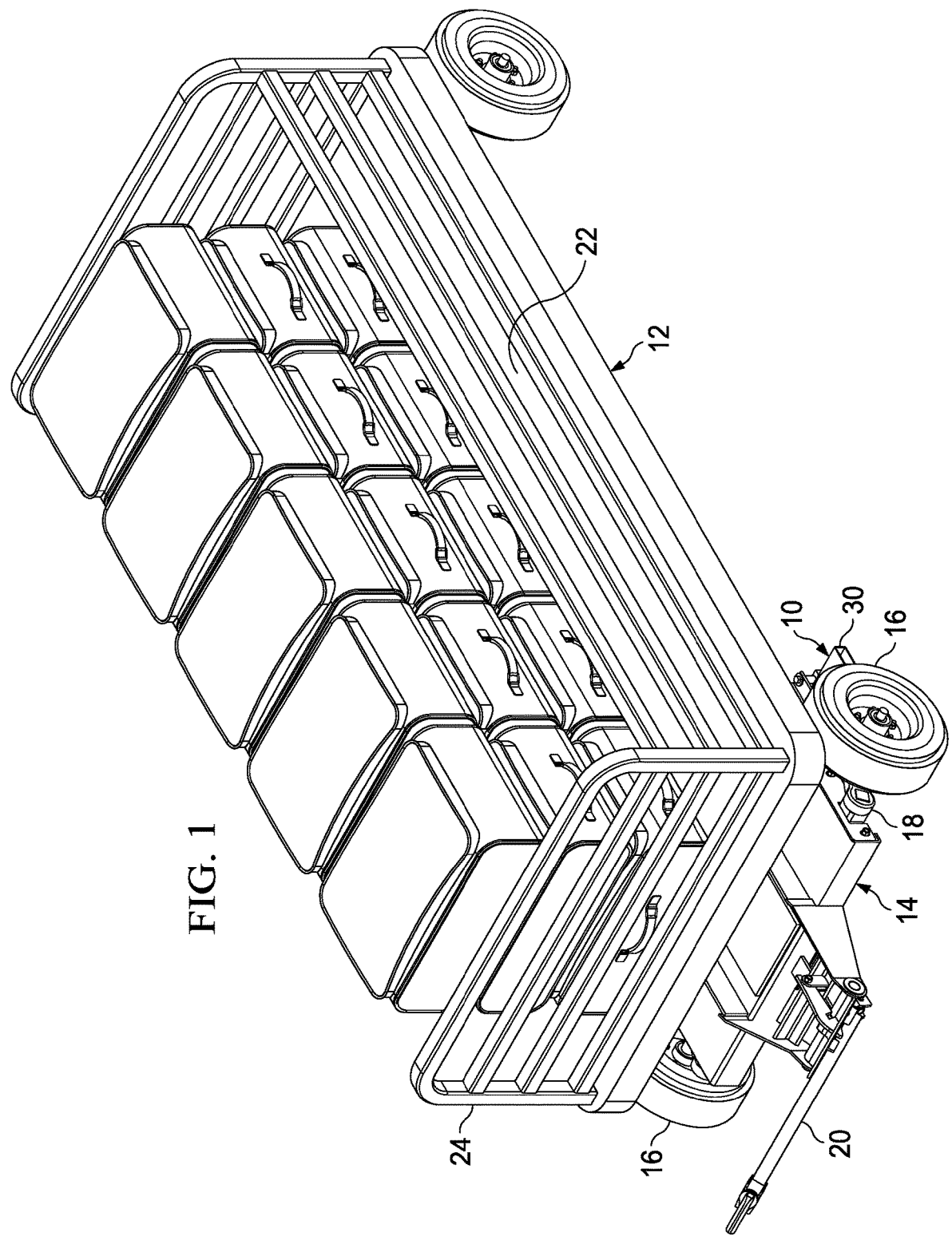
FIG. 1 is a top, left, front perspective view of an embodiment of a vehicle brake system of the present inventive concept in use on a vehicle.

The following detailed description of the present inventive concept references the accompanying drawings that illustrate specific embodiments in which the present inventive concept can be practiced. The embodiments are intended to describe aspects of the present inventive concept in sufficient detail to enable those skilled in the art to practice the present inventive concept. Other embodiments can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "embodiment," "embodiments," or "another embodiment" mean that the feature or features being referred to are included in at least one embodiment of the technology. Separate references to "embodiment," "embodiments," or "another embodiment" in this description do not necessarily refer to the same embodiment and are also not mutually exclusive unless so stated and/or except as will be readily apparent to those skilled in the art from the description. For example, a feature, structure, act, or the like described in one embodiment may also be included in other embodiments, but is not necessarily included. Thus, the present technology can include a variety of combinations and/or integrations of the embodiments described herein.

Turning to the drawings and particularly FIGS. 1-6, an embodiment of a vehicle brake system 10 of the present inventive concept is illustrated in use on a vehicle 12. In the present embodiment, the vehicle 12 is a flatbed utility cart designed for use as airport ground-support equipment (GSE) to carry items, e.g., luggage. Although the system 10 is illustrated via the vehicle 12, it is foreseen that the system 10 may be utilized with other vehicles without deviating from the scope of the present inventive concept.

The vehicle 12 includes a front end 14 having a pair of tires 16 secured to the vehicle 12 via an axle 18, which extends parallel to a y axis of the vehicle 12 and perpendicular to an x axis of the vehicle 12. The front end 14 includes a tow bar 20, which is pivotably secured to and extends from the front end 14 of the vehicle 12. The tow bar 20 is operable to engage a hitch of another vehicle to permit towing of the vehicle 12. The vehicle 12 includes a bed 22 surrounded by railing 24 to secure the items on the vehicle 12 by preventing displacement of the items from the bed 22.

The system 10 includes an elongated brake bar 30 slidably secured to the vehicle 12 via a left side brake guide 32 and a right side brake guide 34. The brake guides 32, 34 are securely mounted to the front end 14 of the vehicle 12 via welding or the like. Each of the guides 32, 34 includes an upper bracket 40 secured to a lower bracket 42 via front and rear bolt and nut assemblies 44, 46. The front and rear bolt and nut assemblies 44, 46 respectively extend through front and rear tubular spacers 48, 50, which space the brackets 40, 42 from each other. In this manner, each of the brackets 40, 42 and each of the spacers 48, 50 collectively define a cavity 52 operable to receive an end portion of the brake bar 30 therethrough.

Figure 3:
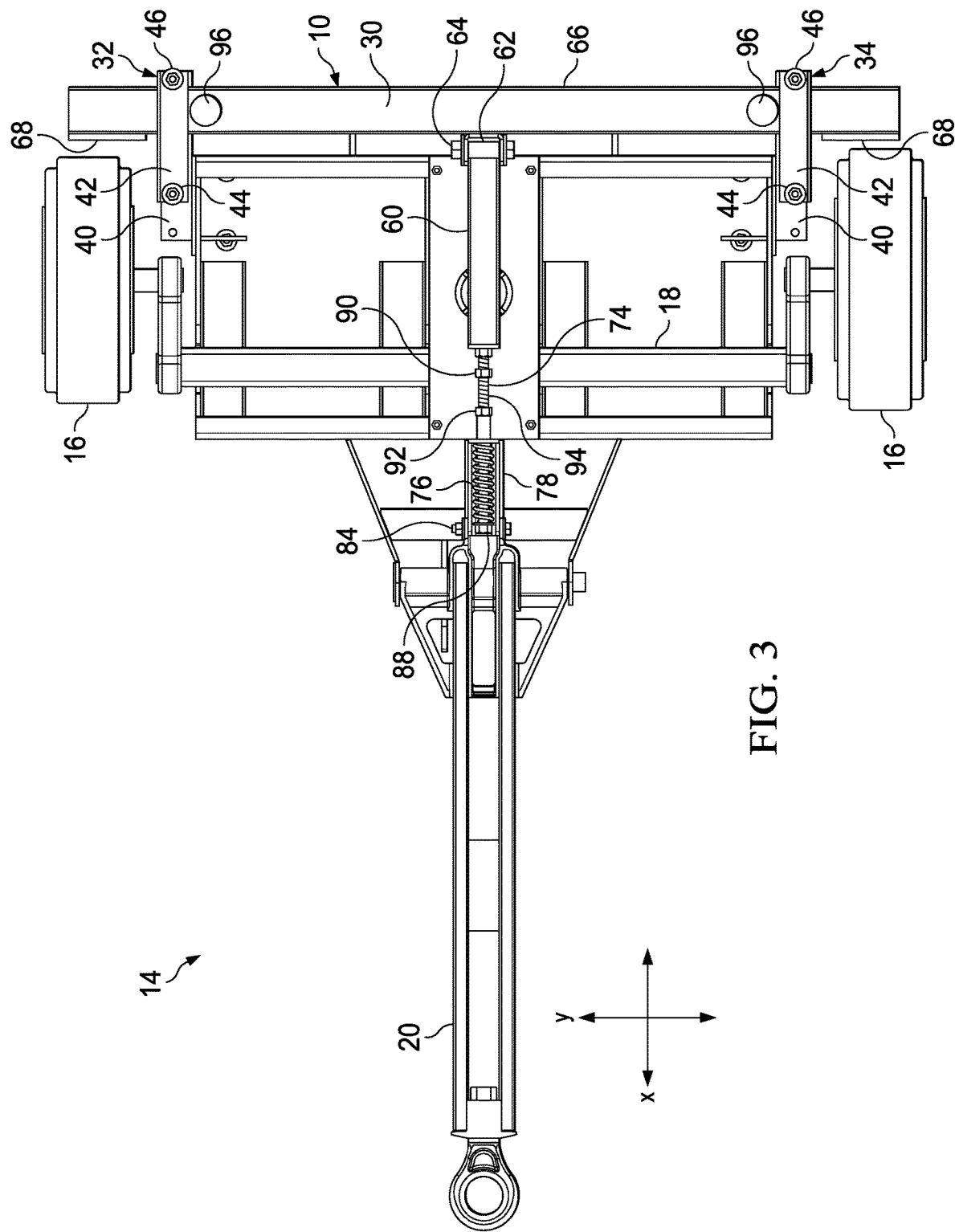
FIG. 3 is a bottom plan view of the vehicle brake system of FIG. 1 in a first configuration with a brake bar spaced from a pair of tires.
Figure 5:
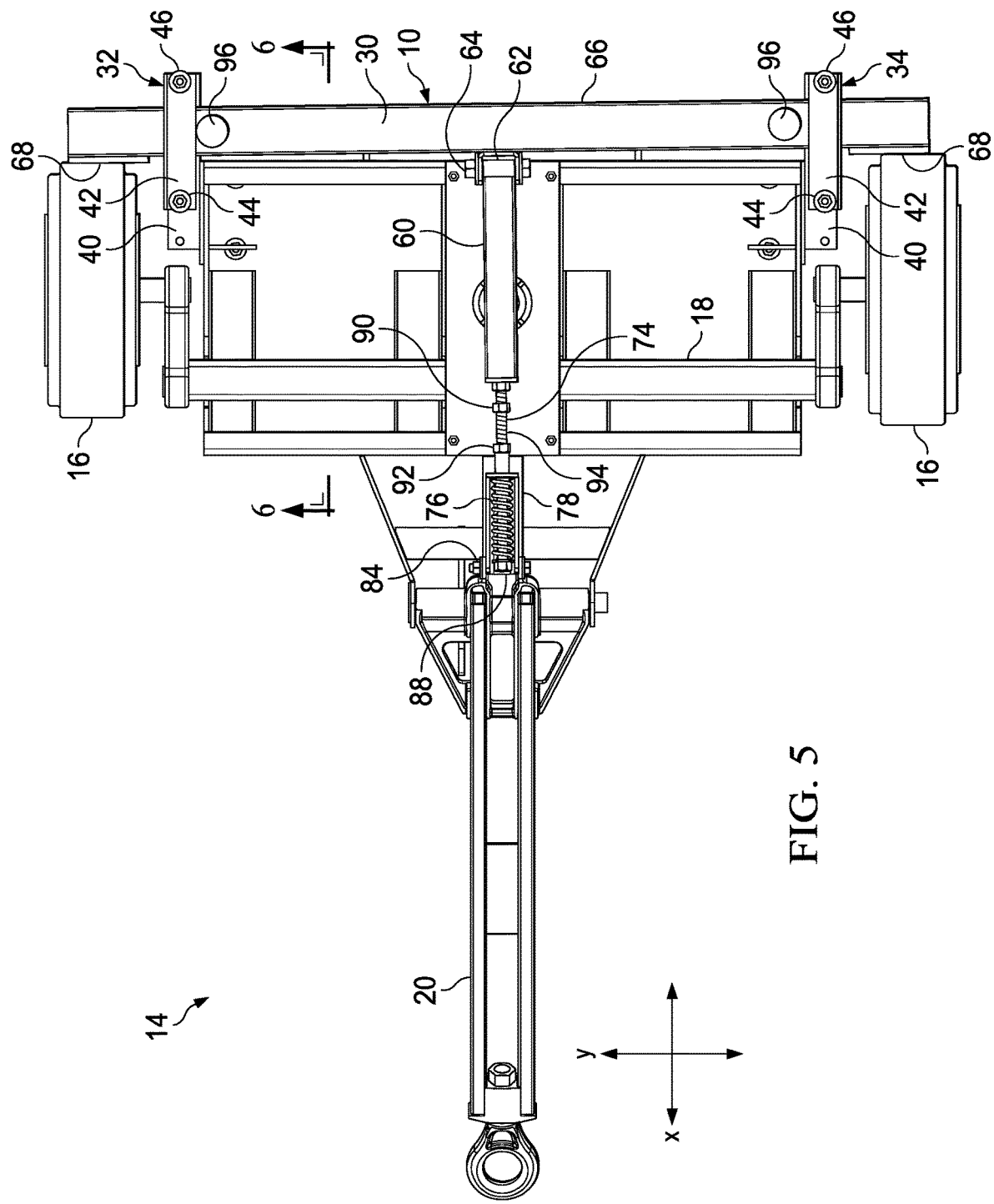
FIG. 5 is a bottom plan view of the vehicle brake system of FIG. 1 in a second configuration with the brake bar abutting the pair of tires.
Figure 6:
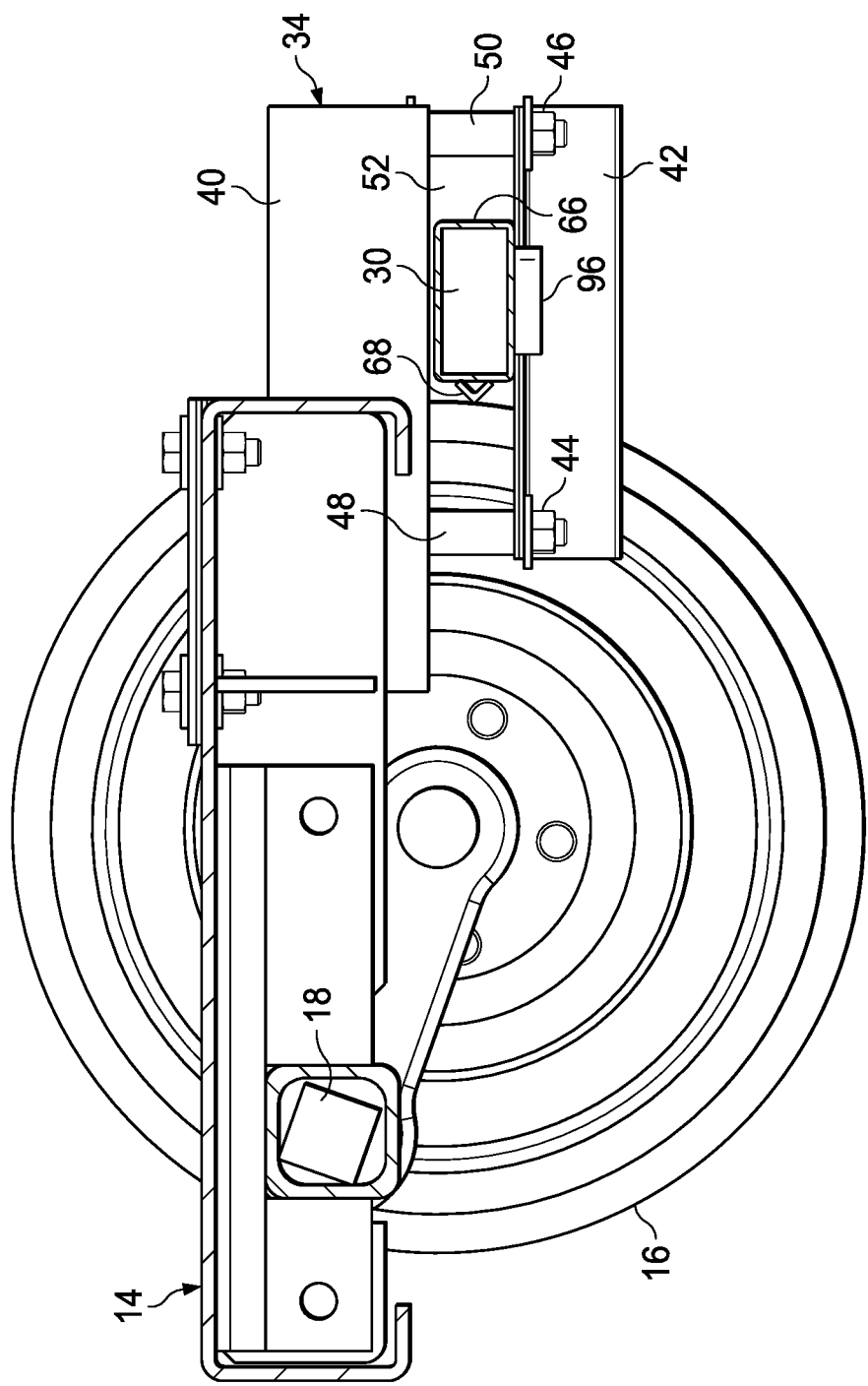
FIG. 6 is a cross-sectional view of the vehicle brake system of FIG. 5 taken through section 6-6.

The system 10 includes a control bar 60 pivotably secured at an end thereof to a center of the brake bar 30 at a hinge 62 of the brake bar 30 via a bolt and nut assembly 64. The control bar 60 extends parallel to the x axis of the vehicle 12, and is operable to cause the brake bar 30 to be slidably moved longitudinally along the brake guides 32, 34 and the x axis of the vehicle 12. The control bar 60 is operable to (i) push the brake bar 30 away from the pair of tires 16 until a rear surface 66 of the brake bar 30 abuts each of the rear spacers 50 and is in a first configuration as illustrated by FIG. 3, and (ii) pull the brake bar 30 toward the pair of tires 16 until brake pads 68 secured at each end of the brake bar 30 abut each of the pair of tires 16 in a second configuration as illustrated by FIG. 5.

At an opposite end of the control bar 60 relative to the end secured to the brake bar 30, the control bar 60 is secured to a link rod 74 via a threaded engagement. The control bar 60 and the rod 74 extend parallel to each other along the x axis of the vehicle 12. The rod 74 resiliently links the control bar 60 to the tow bar 20 of the vehicle 12 via a spring 76 loaded in a shackle 78. The shackle 78 is secured to the tow bar 20 of the vehicle 12 via a hinge 84 and bolt and nut assembly 86. In this manner, the system 10 is only secured to the vehicle via the brake guides 32, 34 and the shackle 78. Further, given (i) the brake bar 30 and the control bar 60 are only secured to the vehicle 12 via the brake guides 32, 34 and the shackle 78, and (ii) the brake bar 30 is slidably engaged to the brake guides 32, 34, the brake bar 30 is operable to move or float a limited distance both (i) longitudinally along the x axis, and (ii) laterally along the y axis of the vehicle 12.

The rod 74 extends through an entirety of the spring 76, partially through an aperture in the end of the shackle 78, and is threaded partially into the control bar 60 via the threaded engagement. The spring 76 is locked onto the rod 74 via a head 88 of the rod 74. The rod 74 includes a plurality of nuts 90, 92 operable to define a variable distance between (i) the control bar 60 and the brake bar 30, and (ii) the shackle 78, e.g., a minimum distance and/or a maximum distance. For instance, the bolt 92 may be positioned via threading or rotating the bolt 92 along a threaded portion 94 of the rod 74 to set a maximum distance the rod 74 is operable to extend through the shackle 78, and also defining a degree of compression of the spring 76 within the shackle 78. The degree of compression of the spring 76 is operable to allow a degree of movement between the brake pads 68 of the brake bar 30 and the tow bar 20, when the tow bar 20 is raised. In this manner, the bolt 92 of the rod 74 is adjustable to define a brake tension.

The system 10 is operable to be retrofitted to existing vehicles by (i) assembling the system 10, and (ii) securing the brake guides 32, 34 and the shackle 78 to an existing vehicle via the brake guides 32, 34 and the shackle 78 so that the brake guides 32, 34 are positioned adjacent to a pair of tires of the existing vehicle. It is foreseen that the shackle 78 and/or the brake guides 32, 34 may be retrofitted to the existing vehicle via welding, a plurality of nut and bolt assemblies, and/or the like.

In use, the system 10 is operated by raising and/or lowering the tow bar 20 of the vehicle 12. To tow the vehicle 12, the tow bar 20 is (i) lowered to extend substantially parallel to and along the x axis of the vehicle 12, and then (ii) secured to another vehicle, which may be a powered vehicle or another unpowered vehicle such as the vehicle 12 to create a train of multiple ones of the vehicle 12.

Figure 2:
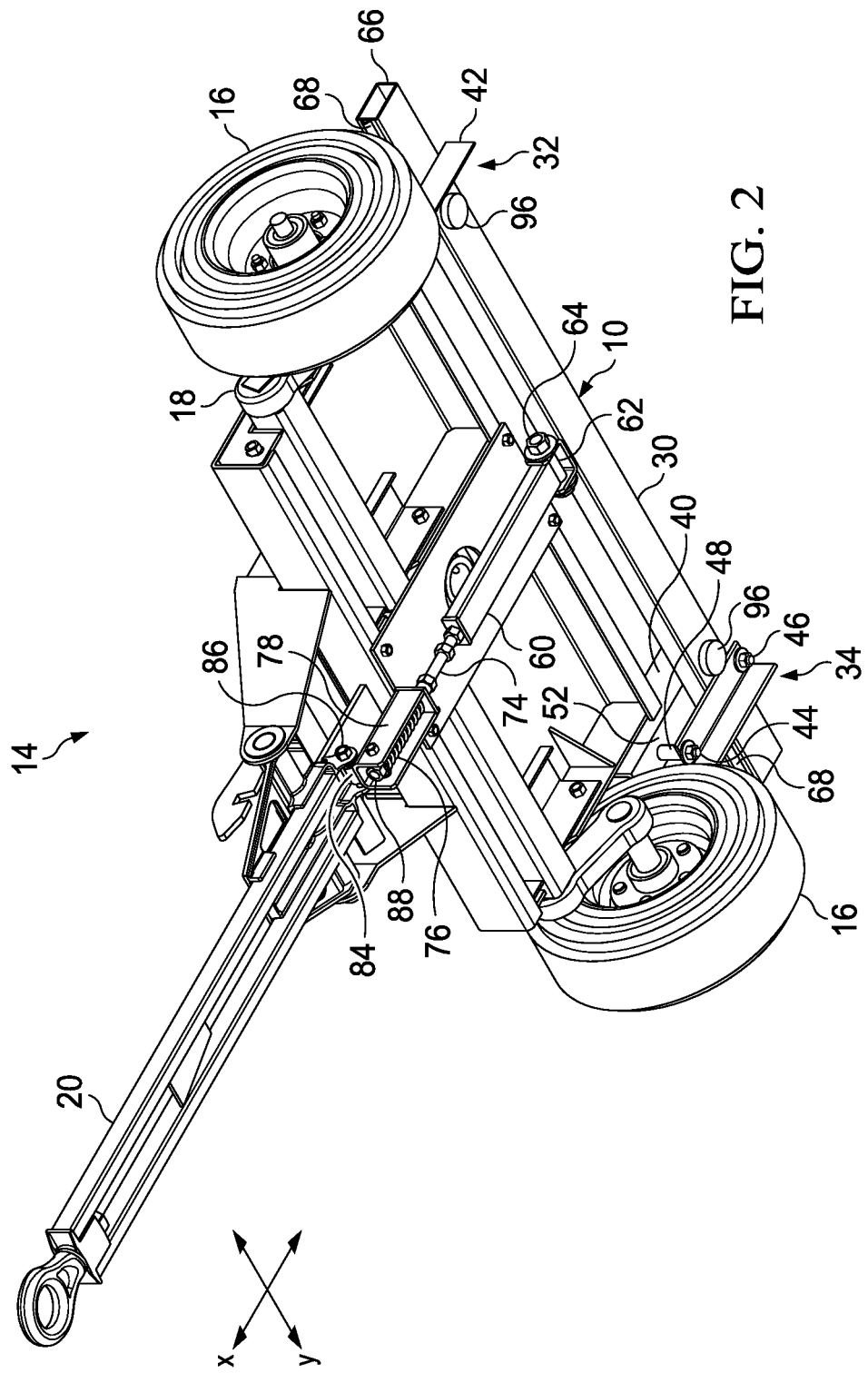
FIG. 2 is a bottom, left, front perspective view of the vehicle brake system of FIG. 1.

When the tow bar 20 is in a lowered position as illustrated by FIG. 2, the tow bar 20 positions the rod 74, which positions the control bar 60, which positions the brake bar 30 so that the brake pads 68 are spaced from the pair of tires 16 as illustrated by FIG. 3. In this manner, the pair of tires 16 are operable to rotate and the vehicle 12 is operable to be moved, e.g., via towing.

Figure 4:
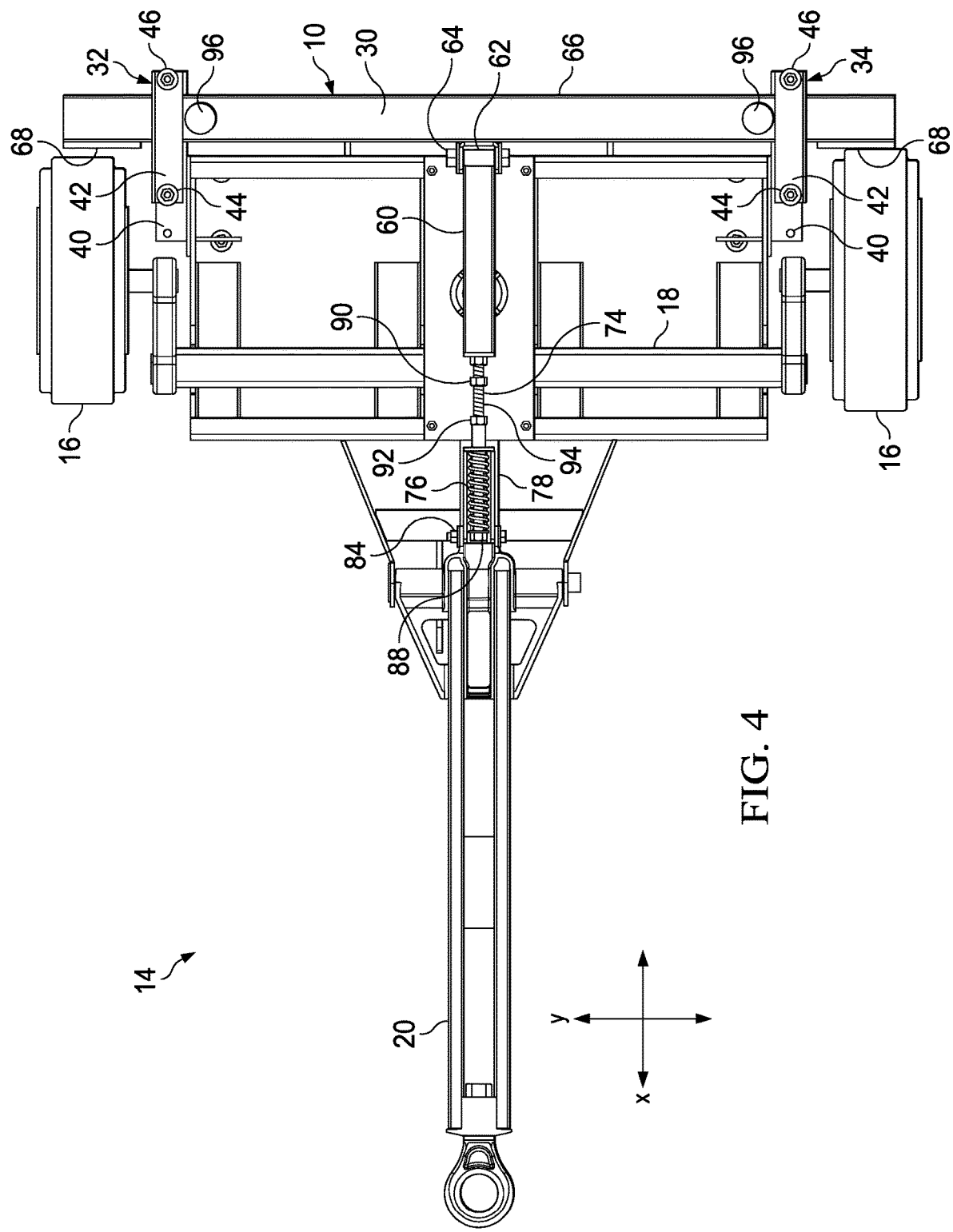
FIG. 4 is a bottom plan view of the vehicle brake system of FIG. 1 in a transitional configuration with the brake bar abutting a first one of the pair of tires and spaced from a second one of the pair of tires.

When the tow bar 20 is moved from the lowered position to a raised position as illustrated by FIG. 1, the tow bar 20 pulls the rod 74, which pulls the control bar 60, which pulls the brake bar 30 so that the brake pads 68 move toward and simultaneously abut the pair of tires 16 as illustrated by FIGS. 4 and 5. The abutment of the brake pads 68 with the pair of tires 16 creates friction therebetween, i.e., a braking pressure, which reduces momentum of the vehicle 12 if it is moving and causes the vehicle 12 to stop moving, or prevents the vehicle 12 from moving if it is not moving. In this manner, the tow bar 20 of the vehicle 12 can be disconnected from another vehicle and raised, which prevents the vehicle 12 from moving.

Further, the ability of the brake bar 30 to move both laterally and longitudinally relative to the vehicle 12 or float, as previously described, allows the brake bar 30 to shift from a parallel configuration relative to the y axis of the vehicle 12 to a non-parallel configuration relative to the y axis of the vehicle 12, which is advantageous in a scenario where the pair of tires 16 has different diameters due to, for example, uneven wear. FIGS. 3-5 illustrate braking pressure being applied on the pair of tires 16 with different diameters. In FIGS. 3 and 4 the brake bar 30 is transitioning from the first configuration with the brake pads 68 spaced from the pair of tires 16 to a transitional configuration with one of the brake pads 68 abutting one of the pair of tires 16 having a larger diameter and spaced from another one of the pair of tires 16 having a smaller diameter. In FIGS. 3 and 4, the brake bar 30 extends parallel to the y axis of the vehicle 12. As the brake bar 30 is pulled further toward the pair of tires 16 by the control bar 60, the brake bar 30 pivots from the parallel configuration to a non-parallel configuration relative to the y axis of the vehicle 12 as illustrated by FIG. 5.

A circular abutment stop 96 is positioned adjacent to each end of the brake bar 30. Each of the stops 96 is operable to limit lateral movement of the brake bar 30 by abutting a most-adjacent one of the lower bracket 42 of the brake guides 32, 34 when the brake bar 30 moves toward the most-adjacent one of the lower brackets 42. In this manner, the stops 96 define a maximum lateral range of movement of the brake bar 30 along the y axis of the vehicle 12.

The brake bar 30 is operable to pivot before an effective amount of pressure, i.e., braking pressure, is applied to either of the pair of tires 16 to effect momentum of the vehicle 12. Thus, the braking pressure is only applied simultaneously, when both brake pads 68 are abutted to the pair of tires 16. In this manner, the system 10 is operable to simultaneously apply an equal braking pressure to each tire of the pair of tires 16 regardless of whether the tires have same or different diameters. The brake bar 30 is returned to the parallel configuration when the tow bar 20 is moved from the raised position to the lowered position, which causes the brake bar 30 to move away from the pair of tires 16 and abut each of the rear spacers 50, which causes the brake bar 30 to become aligned with and extend parallel to the y axis of the vehicle 12.

Turning to FIGS. 7-10, another embodiment of a vehicle brake system 110 of the present inventive concept is illustrated in use on a front end 114 of a vehicle having a pair of tires 116 secured to the front end 114 via an axle 118, which extends parallel to a y axis of the vehicle and perpendicular to an x axis of the vehicle. The front end 114 includes a tow bar 120, which is pivotably secured to and extends from the front end 114 of the vehicle. The tow bar 120 is operable to engage a hitch of another vehicle to permit towing of the vehicle.

The system 110 includes an elongated brake bar 130 slidably secured to the vehicle via brake guides 132, 134 mounted to a center of the front end 114. The brake guides 132, 134 are securely mounted to the front end 114 of the vehicle via welding or the like. Each of the brake guides 132, 134 include a plurality of walls that collectively define a cavity 152 operable to receive portions of a control bar 160.

Figure 7:
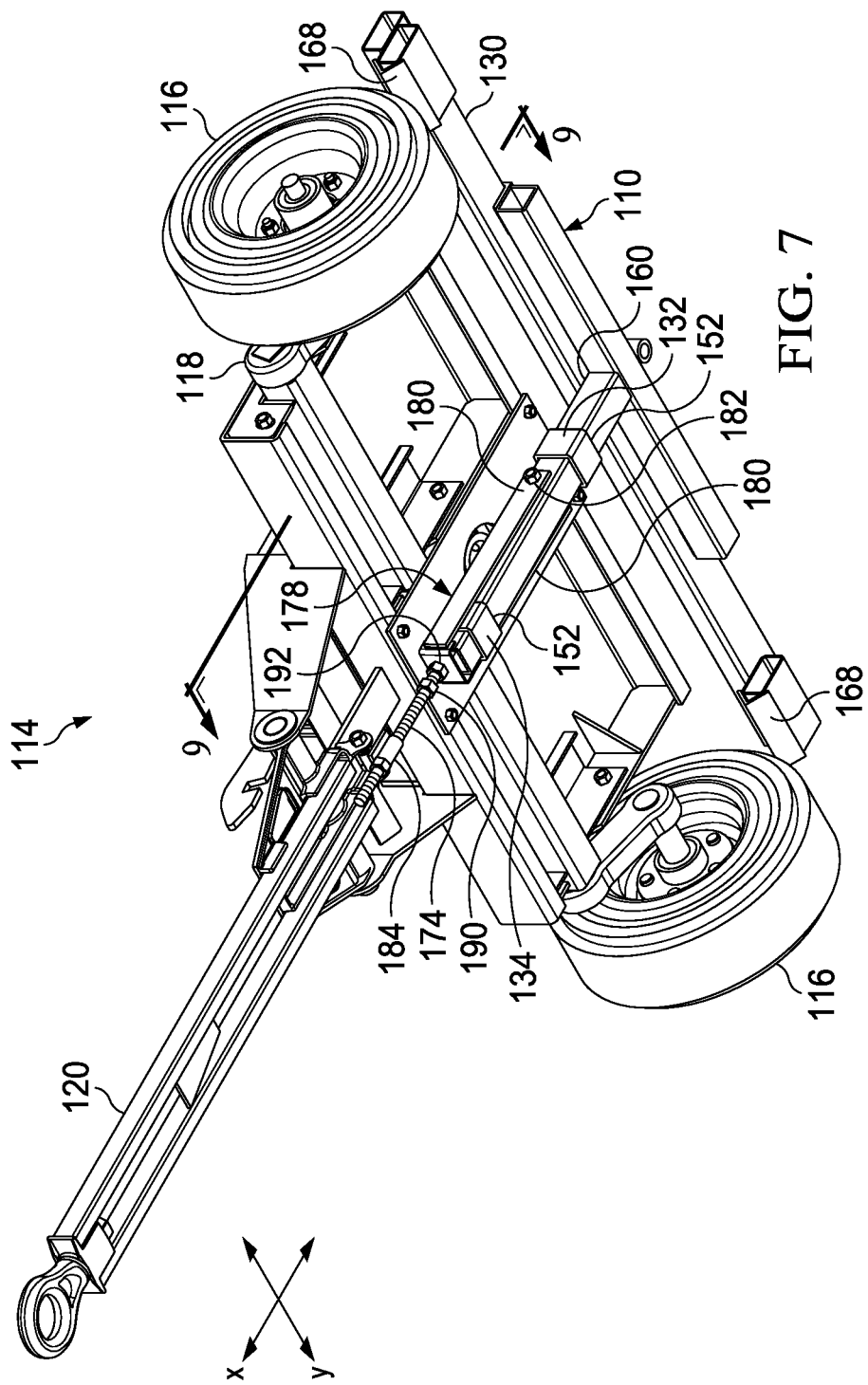
FIG. 7 is a bottom, left, front perspective view of an embodiment of a vehicle brake system of the present inventive concept in use on a vehicle with a brake bar spaced from a pair of tires.
Figure 8:
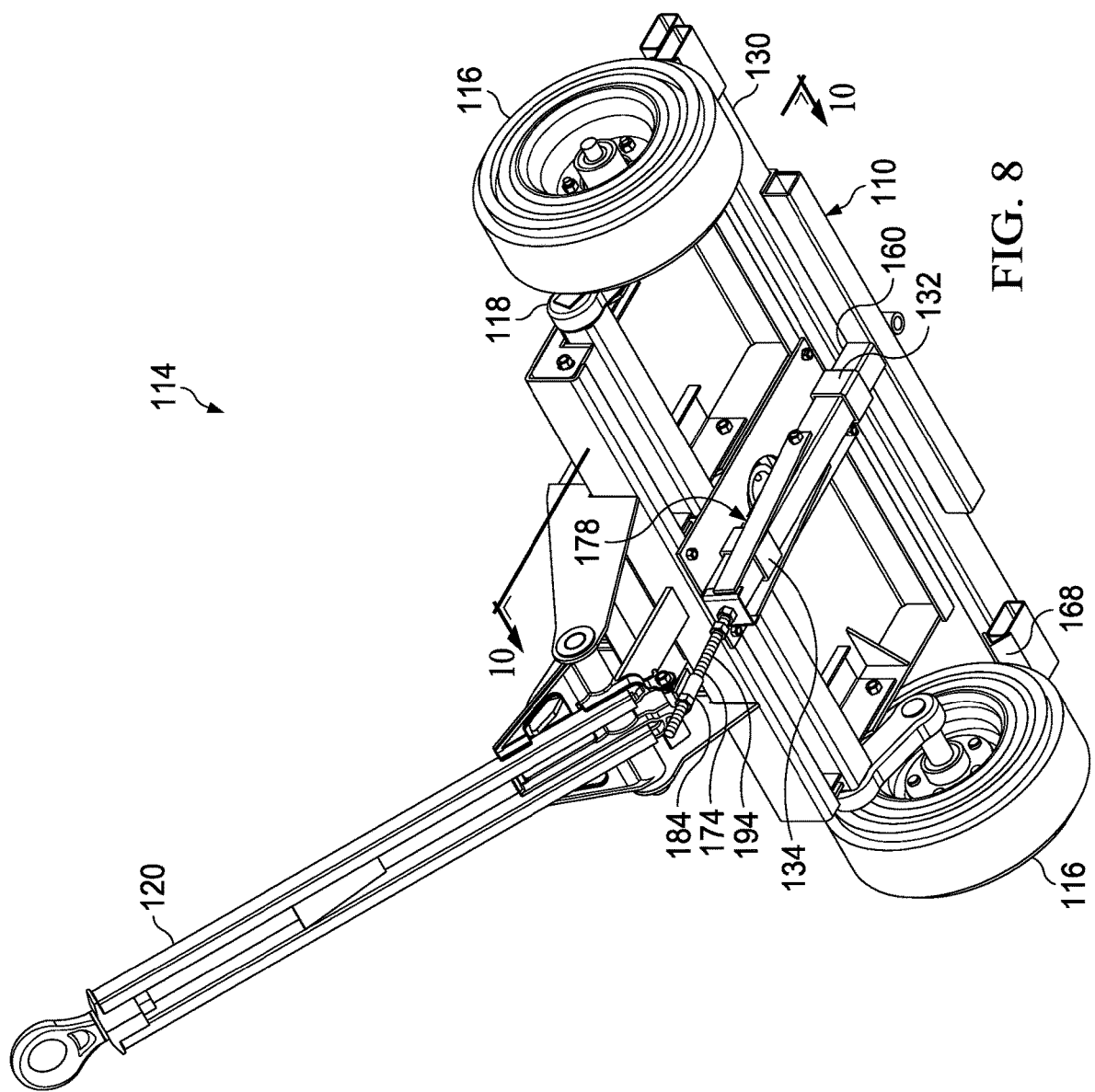
FIG. 8 is a bottom, left, front perspective view of the vehicle brake system of FIG. 7 with the brake bar abutting the pair of tires.
Figure 9:
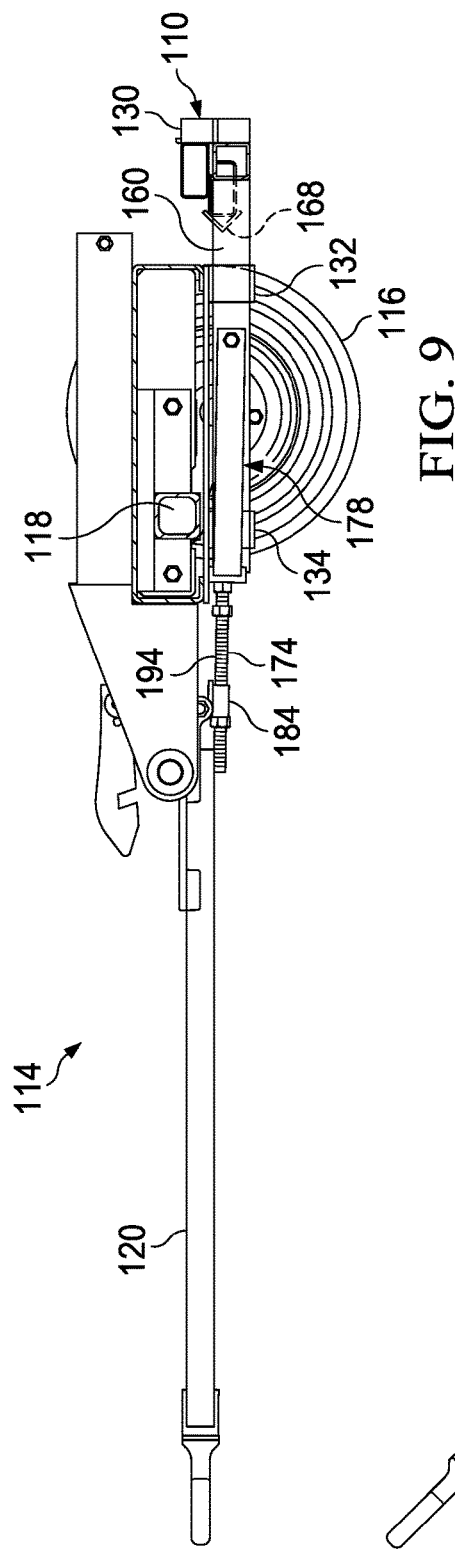
FIG. 9 is a cross-sectional view of the vehicle brake system of FIG. 7 taken through section 9-9.
Figure 10:
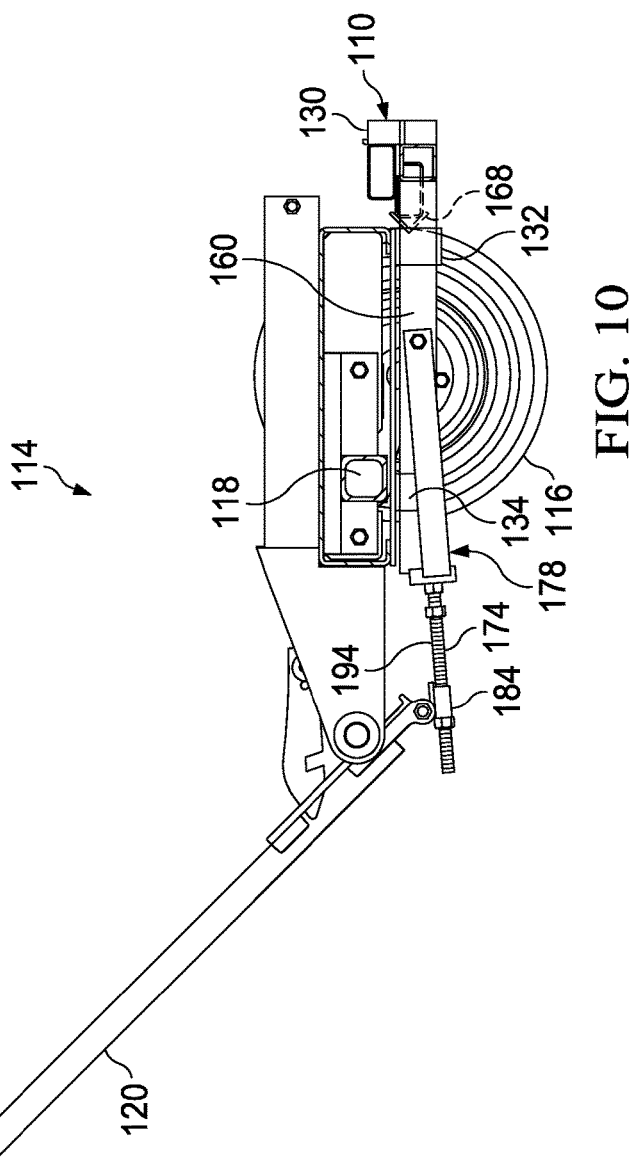
FIG. 10 a cross-sectional view of the vehicle brake system of FIG. 8 taken through section 10-10.

The control bar 160 is pivotably secured, at an end thereof, to a center of the brake bar 130, in a fixed position, via welding or the like. The control bar 160 extends parallel to the x axis of the vehicle, and is operable to cause the brake bar 130 to be slidably moved longitudinally along the brake guides 132, 134 and the x axis of the vehicle. The control bar 160 is operable to (i) push the brake bar 130 away from the pair of tires 116 to a first configuration as illustrated by FIGS. 7 and 9, and (ii) pull the brake bar 130 toward the pair of tires 116 until brake pads 168 secured at each end of the brake bar 130 abut each of the pair of tires 116 in a second configuration as illustrated by FIGS. 8 and 10.

At an opposite end of the control bar 160 relative to the end secured to the brake bar 130, the control bar 160 is secured to a link rod 174 via a threaded engagement. The control bar 160 and the rod 174 extend parallel to each other along the x axis of the vehicle. The rod 174 links the control bar 160 to the tow bar 120 of the vehicle via a shackle 178. The shackle 178 is pivotably secured to the control bar 160 via a plurality of arms 180 of the shackle 178 and a hinge 182 on opposing sides of the control bar 160.

The rod 174 is secured to the tow bar 120 of the vehicle via a coupler 184. In this manner, the system 110 is only secured to the front end 114 of the vehicle via the brake guides 132, 134 and the coupler 184. Further, given (i) the brake bar 130 and the control bar 160 are only secured to the front end 114 of the vehicle via the brake guides 132, 134 and the coupler 184, and (ii) the brake bar 130 is slidably engaged to the brake guides 132, 134, the brake bar 130 is operable to move or float a limited distance both (i) longitudinally along the x axis, and (ii) laterally along the y axis of the front end 114 of the vehicle.

The rod 174 extends through an aperture in the end of the coupler 184 via threading, and is partially threaded into the shackle 178 via the threaded engagement. The rod 174 includes a plurality of nuts 190, 192 operable to define (i) a variable distance between the control bar 160 and the rod 174, and (ii) a variable distance between the rod 174 and the coupler 184, e.g., a minimum distance and/or a maximum distance. For instance, the bolt 192 may be positioned via threading or rotating the bolt 192 along a threaded portion 194 of the rod 174 to set a maximum distance the rod 174 is operable to extend through the shackle 178.

The system 110 is operable to be retrofitted to existing vehicles by (i) assembling the system 110, and (ii) securing the brake guides 132, 134 and the coupler 184 to an existing vehicle via the brake guides 132, 134 and the coupler 184 so that the brake guides 132, 134 cause the brake pads 168 to be positioned adjacent to a pair of tires of the existing vehicle. It is foreseen that the coupler 184 and/or the brake guides 132, 134 may be retrofitted to the existing vehicle via welding, a plurality of nut and bolt assemblies, and/or the like.

In use, the system 110 is operated by raising and/or lowering the tow bar 120 of the vehicle. To tow the vehicle, the tow bar 120 is (i) lowered to extend substantially parallel to and along the x axis of the vehicle, and then (ii) secured to another vehicle, which may be a powered vehicle or another unpowered vehicle such as the vehicle 12 to create a train of multiple ones of the vehicle 12.

When the tow bar 120 is in a lowered position as illustrated by FIGS. 7 and 9, the tow bar 120 positions the rod 174, which positions the control bar 160, which positions the brake bar 130 so that the brake pads 168 are spaced from the pair of tires 116 as illustrated by FIG. 7. In this manner, the pair of tires 116 are operable to rotate and the vehicle is operable to be moved, e.g., via towing.

When the tow bar 120 is moved from the lowered position to a raised position as illustrated by FIGS. 8 and 10, the tow bar 120 pulls the rod 174, which pulls the control bar 160, which pulls the brake bar 130 so that the brake pads 168 move toward and simultaneously abut the pair of tires 116 as illustrated by FIG. 10. The abutment of the brake pads 168 with the pair of tires 116 creates friction therebetween, i.e., a braking pressure, which reduces momentum of the vehicle if it is moving and causes the vehicle to stop moving, or prevents the vehicle from moving if it is not moving. In this manner, the tow bar 120 of the vehicle can be disconnected from another vehicle and raised, which prevents the vehicle from moving.

Further, the ability of the brake bar 130 to move both laterally and longitudinally relative to the vehicle or float allows the brake bar 130 to shift from a parallel configuration relative to the y axis of the vehicle to a non-parallel configuration relative to the y axis of the vehicle, which is advantageous in a scenario where the pair of tires 116 has different diameters due to, for example, uneven wear. In this manner, the brake bar 130 is operable to transition from a first configuration with the brake pads 168 spaced from the pair of tires 116 to a transitional configuration with one of the brake pads 168 abutting one of the pair of tires 116 having a larger diameter and spaced from another one of the pair of tires 116 having a smaller diameter. As the brake bar 130 is pulled further toward the pair of tires 116 by the control bar 160, the brake bar 130 pivots from the parallel configuration to a non-parallel configuration relative to the y axis of the vehicle.

The brake guides 132, 134 are operable to limit lateral movement of the brake bar 130 by abutting a side of the brake bar 130 when the brake bar 130 moves in a lateral direction. In this manner, the brake guides 132, 134 define a maximum lateral range of movement of the brake bar 130 along the y axis of the vehicle.

The brake bar 130 is operable to pivot before an effective amount of pressure, i.e., braking pressure, is applied to either of the pair of tires 116 to effect momentum of the vehicle. Thus, the braking pressure is only applied simultaneously, when both brake pads 168 are abutted to the pair of tires 116. In this manner, the system 110 is operable to simultaneously apply an equal braking pressure to each tire of the pair of tires 116 regardless of whether the tires have same or different diameters. The brake bar 130 is returned to the parallel configuration when the tow bar 120 is moved from the raised position to the lowered position.

Turning to FIGS. 11-14, another embodiment of a vehicle brake system 210 of the present inventive concept is illustrated in use on a front end 214 of a vehicle having a pair of tires 216 secured to the front end 214 via an axle 218, which extends parallel to a y axis of the vehicle and perpendicular to an x axis of the vehicle. The front end 214 includes a tow bar 220, which is pivotably secured to and extends from the front end 214 of the vehicle. The tow bar 220 is operable to engage a hitch of another vehicle to permit towing of the vehicle.

The system 210 includes an elongated brake bar 230 slidably secured to the vehicle via a brake guide 232 mounted to a center of the front end 214. The brake guide 232 is securely mounted to the front end 214 of the vehicle via welding or the like. The brake guide 232 includes a plurality of walls that collectively define a cavity 252 operable to receive a portion of a control bar 260.

Figure 11:
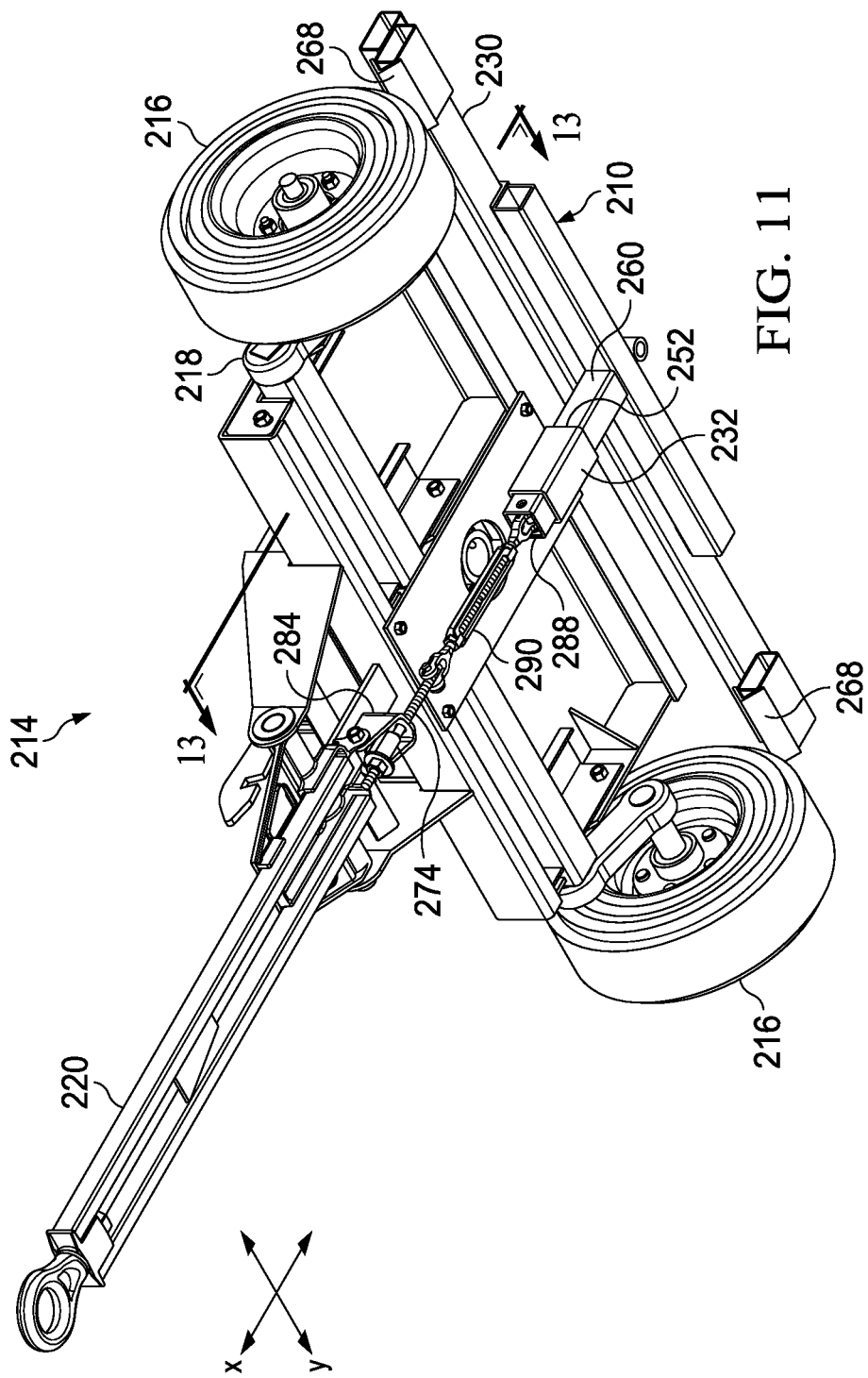
FIG. 11 is a bottom, left, front perspective view of an embodiment of a vehicle brake system of the present inventive concept in use on a vehicle with a brake bar spaced from a pair of tires.
Figure 12:
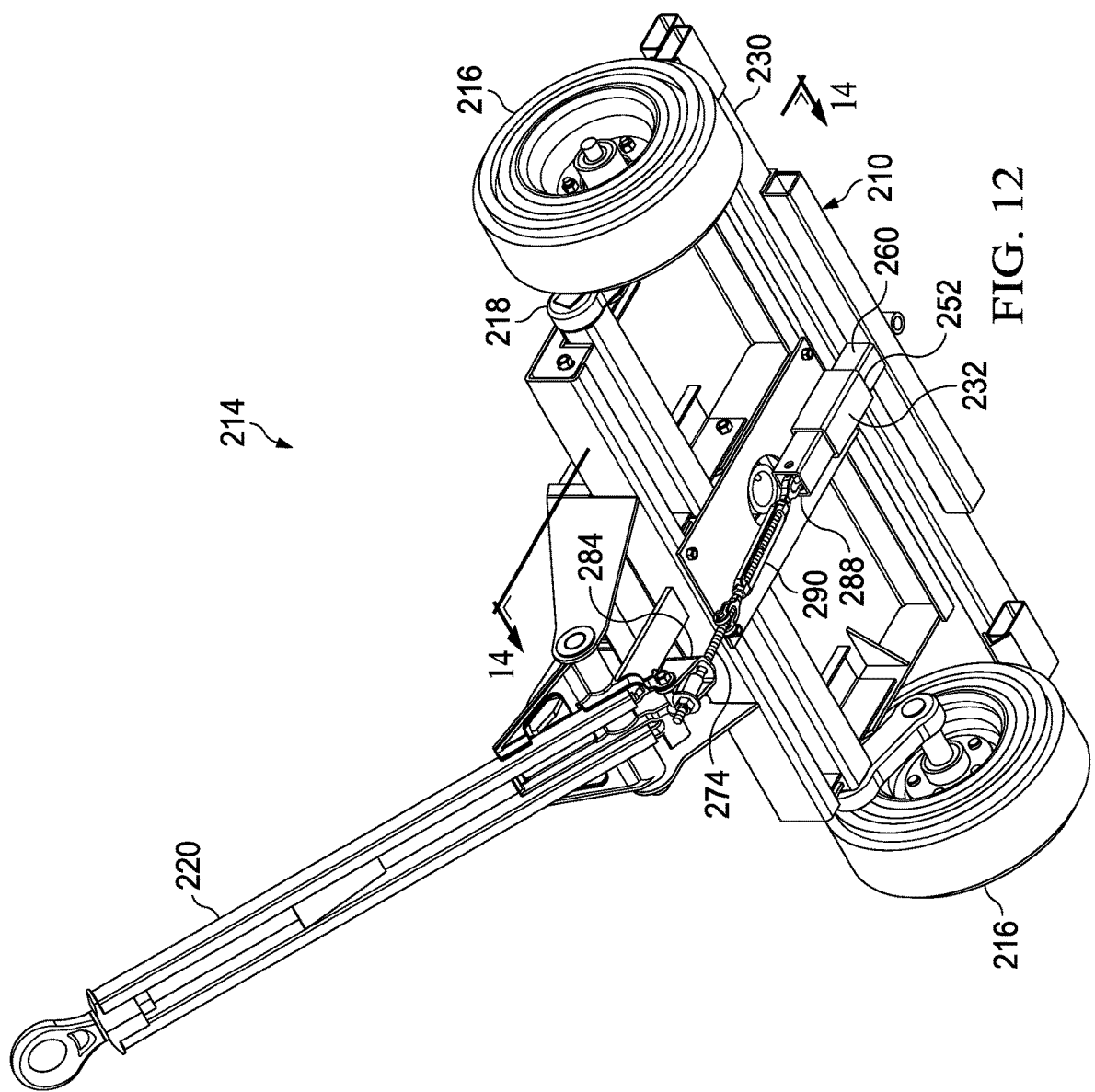
FIG. 12 is a bottom, left, front perspective view of the vehicle brake system of FIG. 11 with the brake bar abutting the pair of tires.

The control bar 260 is pivotably secured, at an end thereof, to a center of the brake bar 230, in a fixed position, via welding or the like. The control bar 260 extends parallel to the x axis of the vehicle, and is operable to cause the brake bar 230 to be slidably moved longitudinally along the brake guide 232 and the x axis of the vehicle. The control bar 260 is operable to (i) push the brake bar 230 away from the pair of tires 216 to a first configuration as illustrated by FIGS. 11 and 13, and (ii) pull the brake bar 230 toward the pair of tires 216 until brake pads 268 secured at each end of the brake bar 230 abut each of the pair of tires 216 in a second configuration as illustrated by FIGS. 12 and 14.

At an opposite end of the control bar 260 relative to the end secured to the brake bar 230, the control bar 260 is secured to a link rod assembly 274 via a threaded engagement. The control bar 260 and the rod assembly 274 extend parallel to each other along the x axis of the vehicle. The rod assembly 274 links the control bar 260 to the tow bar 220 of the vehicle via a non-rotatable coupler 284. In this manner, the system 210 is only secured to the front end 214 of the vehicle via the brake guide 232 and the coupler 284. Further, given (i) the brake bar 230 and the control bar 260 are only secured to the front end 214 of the vehicle via the brake guide 232 and the coupler 284, and (ii) the brake bar 230 is slidably engaged to the brake guide 232, the brake bar 230 is operable to move or float a limited distance both (i) longitudinally along the x axis, and (ii) laterally along the y axis of the front end 214 of the vehicle.

The rod 274 extends through an aperture in the end of the coupler 284 via threading, and is pivotably secured to the control bar 260 via a hinge 288. The rod 274 includes a rotatable coupler 290 operable to define a variable distance between portions of the rod 274, e.g., a minimum distance and/or a maximum distance. For instance, the rotatable coupler 290 may be rotated to increase or decrease the variable distance.

The system 210 is operable to be retrofitted to existing vehicles by (i) assembling the system 210, and (ii) securing the brake guide 232 and the coupler 284 to an existing vehicle via the brake guide 232 and the coupler 284 so that the brake guide 232 causes the brake pads 268 to be positioned adjacent to a pair of tires of the existing vehicle. It is foreseen that the coupler 284 and/or the brake guide 232 may be retrofitted to the existing vehicle via welding, a plurality of nut and bolt assemblies, and/or the like.

In use, the system 210 is operated by raising and/or lowering the tow bar 220 of the vehicle. To tow the vehicle, the tow bar 220 is (i) lowered to extend substantially parallel to and along the x axis of the vehicle, and then (ii) secured to another vehicle, which may be a powered vehicle or another unpowered vehicle such as the vehicle 12 to create a train of multiple ones of the vehicle 12.

When the tow bar 220 is in a lowered position as illustrated by FIGS. 11 and 13, the tow bar 220 positions the rod 274, which positions the control bar 260, which positions the brake bar 230 so that the brake pads 268 are spaced from the pair of tires 216 as illustrated by FIG. 12. In this manner, the pair of tires 216 are operable to rotate and the vehicle is operable to be moved, e.g., via towing.

When the tow bar 220 is moved from the lowered position to a raised position as illustrated by FIGS. 12 and 14, the tow bar 220 pulls the rod 274, which pulls the control bar 260, which pulls the brake bar 230 so that the brake pads 268 move toward and simultaneously abut the pair of tires 216 as illustrated by FIG. 14. The abutment of the brake pads 268 with the pair of tires 216 creates friction therebetween, i.e., a braking pressure, which reduces momentum of the vehicle if it is moving and causes the vehicle to stop moving, or prevents the vehicle from moving if it is not moving. In this manner, the tow bar 220 of the vehicle can be disconnected from another vehicle and raised, which prevents the vehicle from moving.

Further, the ability of the brake bar 230 to move both laterally and longitudinally relative to the vehicle or float allows the brake bar 230 to shift from a parallel configuration relative to the y axis of the vehicle to a non-parallel configuration relative to the y axis of the vehicle, which is advantageous in a scenario where the pair of tires 216 has different diameters due to, for example, uneven wear. In this manner, the brake bar 230 is operable to transition from a first configuration with the brake pads 268 spaced from the pair of tires 216 to a transitional configuration with one of the brake pads 268 abutting one of the pair of tires 216 having a larger diameter and spaced from another one of the pair of tires 216 having a smaller diameter. As the brake bar 230 is pulled further toward the pair of tires 216 by the control bar 260, the brake bar 230 pivots from the parallel configuration to a non-parallel configuration relative to the y axis of the vehicle.

The brake guide 232 is operable to limit lateral movement of the brake bar 230 by abutting a side of the brake bar 230 when the brake bar 230 moves in a lateral direction. In this manner, the brake guide 232 defines a maximum lateral range of movement of the brake bar 230 along the y axis of the vehicle.

The brake bar 230 is operable to pivot before an effective amount of pressure, i.e., braking pressure, is applied to either of the pair of tires 216 to effect momentum of the vehicle. Thus, the braking pressure is only applied simultaneously, when both brake pads 268 are abutted to the pair of tires 216. In this manner, the system 210 is operable to simultaneously apply an equal braking pressure to each tire of the pair of tires 216 regardless of whether the tires have same or different diameters. The brake bar 230 is returned to the parallel configuration when the tow bar 220 is moved from the raised position to the lowered position.

Accordingly, the present inventive concept provides a brake system that is operable to apply an equal amount of friction or braking pressure on a plurality of tires regardless of whether the tires have same or different diameters, can be retrofitted to existing vehicles, is easy to use, is simple and economical to manufacture, and is well adapted for the intended usage thereof.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall there between.

What is claimed is:

1. A retrofittable brake system for a vehicle, the vehicle having a front end, a tow bar pivotably secured to and extending from the front end, a pair of tires secured to the front end via an axle, an x axis extending perpendicular to the axle, and a y axis extending parallel to the axle, the retrofittable brake system comprising:
    a pair of brake guides secured to the front end of the vehicle;
    a brake bar slidably secured to the brake guides so that portions of the brake bar are positioned adjacent to the pair of tires of the vehicle, the brake bar having (i) a first configuration with the portions of the brake bar spaced from the pair of tires, and (ii) a second configuration with the portions of the brake bar abutting the pair of tires;
    a shackle secured to the tow bar of the vehicle; and
    a control bar secured to the brake bar and the shackle, the control bar and the brake bar only secured to the vehicle via the shackle and the brake guides to enable the control bar to simultaneously (i) cause the brake bar to be slidably moved longitudinally relative to the brake guides and between the first configuration and the second configuration, (ii) allow the brake bar to slidably move laterally relative to the brake guides, and (iii) allow the brake bar to abut the pair of tires in a parallel configuration and a non-parallel configuration relative to the y axis of the vehicle,
    wherein,
        the brake bar extends parallel to the y axis of the vehicle and the control bar extends parallel to the x axis of the vehicle in the parallel configuration,
        the brake bar extends at a first angle to the y axis of the vehicle and the control bar extends at a second angle to the x axis of the vehicle in the non-parallel configuration, and
        the tow bar is operable to engage a hitch of another vehicle to permit towing of the vehicle and to be raised and lowered to reposition the brake bar via the control bar.

2. The retrofittable brake system of claim 1,
wherein,
    the control bar is operable to cause the brake bar to be moved between the first configuration and the second configuration by (i) pulling the brake bar toward the pair of tires, and (ii) pushing the brake bar away from the pair of tires.

3. The retrofittable brake system of claim 1,
wherein,
    the control bar extends perpendicularly from the brake bar at a center of the brake bar.

4. The retrofittable brake system of claim 1, further comprising:
    a link rod (i) secured between the control bar and the tow bar, and (ii) defining a variable distance between the control bar and the tow bar.

5. The retrofittable brake system of claim 4,
wherein,
    the variable distance between the control bar and the tow bar is selectively decreased or increased by changing a position of the link rod relative to the tow bar.

6. The retrofittable brake system of claim 1, further comprising:
    a plurality of abutment stops (i) secured to and spaced from each other along the brake bar, and (ii) operable to define a maximum range of lateral movement of the brake bar relative to the brake guides.

7. The retrofittable brake system of claim 1,
wherein,
    the brake bar is operable to move along the x axis of the vehicle.

8. A method of manufacturing a brake system, the method comprising the steps of:
    securing a pair of brake guides to a vehicle;
    securing a shackle to the vehicle;
    securing a brake bar to the brake guides so that portions of the brake bar are positioned adjacent to a pair of tires of the vehicle, the brake bar having (i) a first configuration with the portions of the brake bar spaced from the pair of tires, and (ii) a second configuration with the portions of the brake bar abutting the pair of tires;
    securing a control bar to the brake bar and the shackle, the control bar and the brake bar only secured to the vehicle via the shackle and the brake guides to enable the control bar to simultaneously (i) cause the brake bar to be slidably moved longitudinally relative to the brake guides and between the first configuration and the second configuration, (ii) allow the brake bar to slidably move laterally relative to the brake guides, and (iii) allow the brake bar to abut the pair of tires in a parallel configuration and a non-parallel configuration relative to a y axis of the vehicle; and
    securing a pivotable tow bar to the control bar, the tow bar operable to engage a hitch of another vehicle to permit towing of the vehicle, the tow bar operable to be raised and lowered to reposition the brake bar via the control bar, wherein, the brake bar extends parallel to the y axis of the vehicle and the control bar extends parallel to an x axis of the vehicle in the parallel configuration, and the brake bar extends at a first angle to the y axis of the vehicle and the control bar extends at a second angle to the x axis of the vehicle in the non-parallel configuration.

9. The method of claim 8, wherein, the control bar is operable to cause the brake bar to be moved between the first configuration and the second configuration by (i) pulling the brake bar toward the pair of tires, and (ii) pushing the brake bar away from the pair of tires.

10. The method of claim 8, wherein, the control bar extends perpendicularly from the brake bar at a center of the brake bar.

11. The method of claim 8, further comprising the step of:

securing a link rod between the control bar and the shackle, the link rod defining a variable distance between the control bar and the shackle.

12. The method of claim 11, wherein, the variable distance between the control bar and the shackle is selectively decreased or increased by changing a position of the link rod relative to the shackle.

13. The method of claim 8, further comprising the step of:

securing a plurality of abutment stops to and spaced from each other along the brake bar, the plurality of abutment stops operable to define a maximum range of lateral movement of the brake bar relative to the brake guides.

14. A retrofittable brake system for a vehicle, the vehicle having a front end, a tow bar pivotably secured to the front end, a pair of tires secured to the front end via an axle, an x axis extending perpendicular to the axle, and a y axis extending parallel to the axle, the system comprising:

a pair of brake guides secured the front end of the vehicle;

a brake bar slidably secured to the pair of brake guides so that each one of a first portion and a second portion of the brake bar are positioned adjacent to one of the pair of tires of the vehicle;

a shackle secured to the tow bar of the vehicle; and a control bar secured to the brake bar and the shackle, wherein, the control bar and the brake bar are only secured to the vehicle via the pair of brake guides and the shackle to allow the brake bar to simultaneously:

(i) move longitudinally along the x axis of the vehicle between a first configuration having the first portion and the second portion of the brake bar spaced apart from the pair of tires and a second configuration having the first portion and the second portion of the brake bar abutting the pair of tires, (ii) move laterally along the y axis of the vehicle, and (iii) pivot relative to the y axis of the vehicle between a parallel and a non-parallel configuration, the brake bar extending parallel to the y axis and the control bar extending parallel to the x axis in the parallel configuration, the brake bar extending at a first angle to the y axis and the control bar extending at a second angle to the x axis in the non-parallel configuration.

15. The system of claim 14, wherein, the tow bar of the vehicle is operable to:

engage a hitch of another vehicle to permit towing of the vehicle, move from a lowered position to a raised position to pull the brake bar toward the pair of tires via the control bar, and move from the raised position to the lowered position to push the brake bar away from the pair of tires via the control bar.

16. The system of claim 15, wherein, moving the tow bar from the lowered position to the raised position to pull the brake bar toward the pair of tires via the control bar causes the first portion and the second portion of the brake bar to abut the pair of tires simultaneously when each one of the pair of tires is equal in diameter and when one of the pair of tires is different in diameter.

17. The system of claim 14, wherein, the control bar is operable to cause the brake bar to be moved between the first and second configurations by (i) pulling the brake bar toward the pair of tires, and (ii) pushing the brake bar away from the pair of tires.

18. The system of claim 14, wherein, the control bar extends perpendicularly from the brake bar at a center of the brake bar.

19. The system of claim 14, wherein, a link rod (i) secured between the control bar and the tow bar, and (ii) defining a variable distance between the control bar and the tow bar.

20. The system of claim 19, wherein, the variable distance between the control bar and the tow bar is selectively decreased or increased by changing a position of the link rod relative to the tow bar.

* * * * *